United States Patent
Underdown

Patent Number: 5,656,323
Date of Patent: Aug. 12, 1997

[54] LOW FAT SPREAD

[75] Inventor: Jeffrey Underdown, Higham Ferrers, Great Britain

[73] Assignee: Van den Bergh Foods Company, Division of CONOPCO, Inc., Lisle, Ill.

[21] Appl. No.: 586,782

[22] PCT Filed: Jul. 20, 1994

[86] PCT No.: PCT/EP94/02396

§ 371 Date: Jan. 23, 1996

§ 102(e) Date: Jan. 23, 1996

[87] PCT Pub. No.: WO95/03707

PCT Pub. Date: Feb. 9, 1995

[30] Foreign Application Priority Data

Jul. 27, 1993 [EP] European Pat. Off. .............. 93305926

[51] Int. Cl.[6] .................................... A23D 7/015
[52] U.S. Cl. .................... 426/603; 426/602; 426/604
[58] Field of Search .................... 426/602, 603, 426/601, 604

[56] References Cited

U.S. PATENT DOCUMENTS

| | | | |
|---|---|---|---|
| 4,362,758 | 12/1982 | MacNeill | 426/604 |
| 4,540,593 | 9/1985 | Moran | 426/604 |
| 4,808,334 | 2/1989 | Ezaki | 252/314 |
| 4,849,243 | 7/1989 | Sreenwasan | 426/603 |
| 4,869,915 | 9/1989 | Inayoshi | 426/562 |
| 4,882,187 | 11/1989 | Izzo | 426/603 |
| 4,917,915 | 4/1990 | Cain | 426/603 |
| 4,943,445 | 7/1990 | Norton | 426/603 |
| 5,077,077 | 12/1991 | Suzuki | 426/602 |
| 5,194,285 | 3/1993 | Norton | 426/603 |
| 5,279,847 | 1/1994 | Okonogi | 426/603 |
| 5,294,455 | 3/1994 | O'Brien | 426/603 |
| 5,322,704 | 6/1994 | Gaonkar | 426/602 |
| 5,332,595 | 7/1994 | Gaonkar | 426/602 |
| 5,338,561 | 8/1994 | Campbell | 426/575 |
| 5,472,729 | 12/1995 | Larsson | 426/603 |

FOREIGN PATENT DOCUMENTS

| | | | |
|---|---|---|---|
| 0120967 | 10/1984 | European Pat. Off. . | |
| 0141477 | 5/1985 | European Pat. Off. . | |
| 0239378 | 9/1987 | European Pat. Off. . | |
| 0345075 | 12/1989 | European Pat. Off. . | |
| 2644326 | 3/1989 | France . | |
| 60-034155 | 2/1985 | Japan . | |
| 93/17565 | 9/1993 | WIPO | 426/603 |
| 93/24016 | 12/1993 | WIPO | 426/603 |

*Primary Examiner*—Carolyn Paden
*Attorney, Agent, or Firm*—A. Kate Huffman

[57] ABSTRACT

A water-continuous spread containing from 0.1 to 20 wt. % of fat, said spread being a W/O/W emulsion comprising hydrolysed starch with a DE of 1–6 in the external phase at a concentration above its critical gelling concentration, said spread having a stress strain relation with a maximum stress occurring at a strain of 0.001–1, the maximum stress at this strain being 0.01 to 100 kPa and with a ratio of plastic stress and the maximum stress of 0.1 to 1.

10 Claims, No Drawings

LOW FAT SPREAD

The present invention is concerned with spread products, in particular with spread products having a continuous waterphase of low fat content, and processes for their preparation.

BACKGROUND OF THE INVENTION

Many attempts have been made to formulate fat-continuous low fat spread products. Amongst the various reasons why such products are desired is the wish to reduce the caloric content of the spread and other dietetic considerations and to a minor extent the wish to lower the production costs, in particular by reducing the raw material costs.

A substance that has widely been applied as a fat extender is water. This use of water has, for example, led to the introduction of so-called halvarines. If relatively high levels of water are used, often thickening agents and/or gelling agents are used for avoiding adverse effects of the high water level.

For example EP 298 561 (Unilever N.Y.) describes the preparation of edible plastic dispersions not having a continuous fat phase, said composition including at least two gelling agents forming two gel-forming compositions.

U.S. Pat. No. 4,869,916 (Kuniaki Inayoshi et al) discloses a "whipped oily flavor" containing more than 5% of oil with a 100% overrun which can be in the form of W/O/W-emulsion containing at least 7% of a low-sweet saccharide as e.g. maltodextrin so as to provide a freeze resistance to the final product and an emulsifier like polyglycerol ricinoleic acid ester. From the fact that the intermediate emulsion is whipped to an overrun of about 100% it can be deduced that the intermediate emulsion before whipping must be low viscous and not in the form of a plastic gel which teaches away from the use of a gelling maltodextrin above its critical concentration. Also the fact that maltodextrin is used as a protection against freezing suggests strongly that the maltodextrin used has a low average molecular weight and consequently a high DE (Dextrose Equivalent) because this results in a higher freezing point depression at a given weight quantity of low-sweet sugar. Consequently U.S. Pat. No. 4,869,916 points away from the use in a W/O/W emulsion of a gelling hydrolysed starch c.q. maltodextrin with a higher average molecular weight and lower DE i.e. from about 1–6 and above its critical gelling concentration.

SUMMARY OF THE INVENTION

It is the object of the present invention to formulate water-continuous, (very) low fat spread products having an improved flavour release, appearance, texture, mouthfeel and/or rheology. Surprisingly it has been found that these high quality, low fat products can be obtained if specific levels of fat are used and the spread has a specific three phase structure.

Accordingly the present invention provides a water-continuous spread containing from 0.1 to 20 wt. % of fat, said spread being a W/O/W emulsion comprising hydrolysed starch with a DE of about 1–6 in the external phase at a concentration above its critical gelling concentration, said spread having a stress strain relation with a maximum stress occurring at a strain of 0.01–1, the maximum stress at this strain being 0.1 to 100 Kpa and with a ratio of plastic stress and the maximum stress of 0.1 to 1. Compositions of the invention comprise two aqueous phases: a continuous external water phase, containing a fat phase dispersed therein and an internal aqueous phase dispersed in said fat phase.

DESCRIPTION OF THE PREFERRED EMBODIMENTS

Preferably the dispersed phases (fat phase plus internal aqueous phase dispersed in the fat phase) constitute from 1 to 80 wt % of the product, more preferred 2 to 50 wt %, most preferred 3 to 30 wt %. Within the dispersed phases the weight ratio of fat to water is preferably from 50:1 to 1:50, more preferred 2:1 to 1:30, most preferred 1:1 to 1:20.

The external aqueous phase preferably constitutes from 20 to 99 wt %, more preferred 50–98 wt %, most preferred 70 to 97 wt % of the product.

According to an embodiment of the invention the external aqueous phase is gelled or thickened. This can be accomplished by incorporating gelling or thickening agents, preferably gelling hydrolysed starch and a gelling agent, especially gelatin, in the composition e.g. at a level of from 0.1 to 30 wt % taken together. Of course the level should exceed the critical gelling concentration, but on the other hand the maximum solubility should not be exceeded. Any commercially available gelatin may be used, although it is preferred to have a gelatin having a bloom strength between 100 and 300, such as 120, 150 and 250. Especially preferred is the use of gelatin having a bloom strength of about 200 to 270.

Especially preferably, compositions of the invention contain from 0.5 to 20 wt % of thickening or gelling biopolymer materials, for example gelling starches, gums or proteins. The biopolymers may be added as such or may for example be included in the form of commercially available fat-replacers.

The preferred levels of biopolymers for obtaining optimum product properties (e.g. plasticity and/or non-thixotropy), generally also depend on the type of biopolymer used. Also the preferred amount of biopolymers is dependant on the desired degree of thickening or gelling and the presence of other ingredients in the composition.

If gums or thickening polysaccharides other than gelling starches are used, their preferred level is 0.1 to 5 wt %, more preferred 0.15 to 3 wt %, most preferred 0.2 to 2 wt %. Suitable gums may for example be selected from the group of agar, alginate, gum arabic, carrageenan, furcelleran, ghatti, guar, karaya, latch, locust bean, pectin, tragacanth and xanthan gum. Especially preferred is the use of agar, carrageenan, furcelleran, guar, locust bean, pectin and xanthan gum. Most preferred is the use of locust bean, pectin and xanthan gum. The term pectin also includes calcium sensitive pectins and modified pectins such as amidated pectins etc. Also preferably the biopolymers may be incorporated by including commercially available fat-replacers based on gums, for example Slimgel™ (powder from a phase separated mixture of gelatin and guar or locust bean gum) and Veri-Lo™ (an oil in water emulsion stabilized by emulsifiers and embedded in sheared agar particles). Also preferably sheared thermoreversible polysaccharide gels or sheared chemically set polysaccharide gels may be used such as for example disclosed in EP-A-355 908 or EP-A-432 835.

If starches are used as biopolymer material, preferably gelling starches are used. It is preferred to use hydrolysed starches with a DE (Dextrose Equivalent) of 1 to 6, most preferably from 2 to 4. Especially preferred is the use of gelling modified starches/maltodextrins, for example hydrolysed starches such as Paselli SA2 (AVEBE), N-oil (National Starch & Chemical Corp.), and microcrystalline cellulose. Also commercially available fat-replacers which are based on such biopolymer materials may be used, for example Stellar™ (a starch based powder from corn maltodextrin), Trailblazer™ (coacervate of a protein + polysaccharide complex, such as egg albumin and xanthan gum) and Raftilene™ LS (inulin). The level of (modified) starches is preferably 5 to 20 wt %, more preferred 6 to 17 wt %, most preferred 7 to 15 wt %; if the modified starches are used in combination with other biopolymer materials, their level may be lower for example 0.05 to 10 wt %.

If proteins are used as biopolymer material, preferably proteins are used as disclosed in EP 237 120. Examples of suitable materials are gelatin, storage protein e.g. soy protein, milk protein, sodium caseinate etc. Especially preferred is the use of gelling proteins, most preferred is the use of gelatin. The level of (gelling) proteins is preferably from 0.5 to 10 wt %, more preferred 0.7 to 7 wt %, most preferred 0.9 to 5 wt %. Also commercially available fat replacers based on these materials may be used for example Simplesse™ (dispersion of microparticulated whey protein or egg white particles) or Dairy-Lo™. The use of gelling agents often in conjunction with a thickening agent is especially important in the external water phase.

Especially preferably, compositions of the invention contain at least two biopolymer materials, each being present at a level from 0.1 to 20 wt %. For a very good rheology these two biopolymer materials are preferably capable of forming two gelled aqueous phases which together form the external aqueous phase.

The critical gelling concentration of a gelling agent is the concentration level at which said gelling agent will start to form a gel. The critical gelling concentration of a gelling agent in a particular composition can be calculated from measurements of the shear modulus of a series of samples containing different concentrations of a gelling agent as described in Br. Polymer J. 17, (1985) 164. If the critical concentration of a combination of gelling agents is to be determined, then the critical concentration of such mixture of gelling agents is determined in a manner analogous to the procedure described above.

Compositions of the invention comprise from 0.1 to 20 wt % of fat, more preferred the level of fat is more than 0.5 wt % and less than 15 wt %, most preferred are fat levels from 1 to 10 wt %.

Compositions of the invention preferably also comprise an emulsifier system in a level up to 5 wt % (more preferably 0.01 to 3 wt %) on total product, more preferably the emulsifier system comprises both an oil-in-water (o/w) emulsifier and a water-in-oil (w/o) emulsifier. A very efficient w/o emulsifier is Admul WOL (e.g. polyglycerol ester of polyricinolenic acid) and an good o/w emulsifier is e.g. sodium caseinate. The amount of emulsifiers used depends inter alia on the amount of water in the spread and the nature of the emulsifier. Preferably the amount of w/o emulsifier ranges between 0.05 to 2 wt % on total product and the amount of o/w emulsifier between 0.5 and 1 wt %. Most preferable the weight ratio w/o to o/w emulsifiers ranges from 2:1 to 1:10 whereby the former relates to products with a high internal phase content and the latter relates to products with a low internal phase content.

Throughout this specification the terms oil and fat are used interchangeably. They are meant to include triglycerides of natural or synthetic origin such as soybean oil, sunflower oil, palm oil, fish oil, rapeseed oil, coconut oil, and hydrogenated, fractionated and/or interesterified triglyceride mixtures as well as edible substances that are physically similar to triglycerides such as waxes, e.g. jojoba oil and poly fatty acid esters of mono- or disaccharides, and that can be used as replacement for or in admixture with triglycerides. Preferably, vegetable oils are used, which are liquid, at 5° C.

In an embodiment of the invention spreads are provided in which the fat phase is based on highly unsaturated vegetable oils as e.g. sunflower oil, low-erucic rapeseed oil, soya bean oil etc.

It is important that spreads of the invention are plastic in the sense that they can be spread onto bread without tearing the bread. Generally plastic spreads will have a stress strain relation with a maximum stress occurring at strain of 0.01–1 (preferably 0.1 to 0.3), the maximum stress at this strain being 0.01–100 Kpa (preferably 0.1 to 50 Kpa) and with a ratio of plastic stress and the maximum stress of 0.1 to 1, preferably above 0.5. A suitable method for determining these values is given in EP-A-298 561.

In addition to the above mentioned ingredients, spreads of the invention may comprise a number of optional ingredients such as flavouring, salt, preservatives, acidifiers, vitamins, colouring materials etc.

Preferably the level of flavouring materials is 0.01 to 2 wt %. Preferably, the level of salt (sodium chloride) is from 0–4 wt %, more preferred 0.1 to 3 wt %, most preferred 0.3 to 1.5 wt %. Preservatives are preferably incorporated at a level of 0–4 wt %, more preferred 0.01 to 1 wt %, most preferred 0.05 to 0.3 wt %. Especially preferred is the use of potassium sorbate. A preferred colouring material is β-carotene; preferred levels of colouring material are from 0–1 wt %, more preferred 0.01 to 0.2 wt %. Acidifiers may be incorporated to bring the pH of the product to the desired level, preferably the pH of the product is from 3 to 10, more preferred 3.5 to 7. A suitable acidifier is for example lactic acid or citric acid.

The spread may further containing small particles such as herbs and vegetables. The total level thereof will generally be less than 10 wt %.

Spreads of the invention will generally comprise fairly high levels of water, say from 75 to 99.9 wt % of the composition, more preferred 80 to 99.5 wt %, most preferred 85 to 99 wt %. Water may be incorporated as such, or as part of the other ingredients such as milk etc. Spreads of the invention are water-continuous in the sense that they comprise a continuous aqueous phase. Water-continuous spreads can readily be distinguished from fat-continuous spreads by virtue of conductivity measurements.

Spreads of the invention can suitably be used as bread spreads to replace e.g. margarine or halvarine, but they can also suitable be used as flavoured spread, for example cheese spreads, meat spreads, nut spreads, sweet spreads or vegetable spreads.

Spreads of the invention are preferably prepared by first preparing the internal W/O phase with optionally fat soluble flavours, followed by dispersing this in the external water phase.

The invention is now illustrated by the following limitative example. All parts and percentages are taken by weight unless otherwise indicated.

EXAMPLE 1

A W/O/W spread was prepared containing 87.5 wt % of external water phase and 12.5 wt % of internal (W/O) phase. The internal phase consisted of a 60:40 mixture of water emulsified in rapeseed oil (containing 0.1 wt % fat soluble flavour). The total fat level of the product was hence 5 wt %.

For comparison (COMP1) the same external phase was used at 95 wt % in combination with 5 wt % flavoured rapeseed oil to form a O/W spread.

For comparison (COMP2) the same external phase was used at 87.5 wt % in combination with 12.5 wt % flavoured rapeseed oil to form a O/W spread.

The composition of the external phase was:

| Ingredient | Percentage (w.w.) |
| --- | --- |
| Salt | 1 |
| Gelatin (270 Bloom) | 3 |
| NSCC 6110* | 10 |
| Water | 85 |
| Sodium caseinate | 1 |

The composition of the internal phase according to the invention was:

| Ingredient | Percentage (w.w.) |
| --- | --- |
| water | 57.9 |
| rape seed oil (low erucic) | 40 |
| Admul WOL | 2 |
| Flavour (fat soluble) | 0.1 |

*NSCC 6110 is a maltodextrin ex National Starch & Chemical Corporation with a DE = 7.

The composition was prepared by the procedure described below:

The internal phase is prepared by mixing the emulsifier and oil at elevated temperature (50–100° C.) followed by adding the water under shear. A W/O emulsion is formed. The ingredients of the external aqueous phase are then added and the mixture is cooled in scraped surface heat exchangers. The resulting product is a W/O/W spread.

The comparative products were prepared by mixing the oil with the ingredients of the external phase followed by cooling in scraped surface heat exchangers. The resulting product is a O/W spread.

When the appearance of the products was compared, it appeared that the 5% fat product of the invention had an appearance similar to the 12.5% fat comparative product (COMP2) and less similar to the 5% fat comparative product (COMP1). Also, surprisingly, the product of the invention had a flavour/salt release which was slower than either the COMP1 or the COMP2 product and was similar to the flavour/salt release of a commercially available 25% fat product (GOLD LOWEST marketed in the UK). The product according to the invention was an excellent plastic spread of good texture, mouthfeel and theological properties which did not tear bread upon spreading. Moreover the fatty phase was based on highly unsaturated triglycerides (low erucic rapeseed oil).

The rheological data of the products prepared are tabulated below:

| Sample | Max. stress | Yield strain | Stress ratio |
| --- | --- | --- | --- |
| 5% fat | 4.7 kPa | 0.17 | 0.89 |
| 12.5% fat | 4.2 kPa | 0.17 | 0.91 |
| Comparison 5% fat | 3.9 kPa | 0.15 | 0.87 |

Yield strain equals strain occurring at maximum stress.
Stress ratio equals ratio of plastic and maximum stress.

EXAMPLE 2

The procedure described in Example 1 was followed for preparing a spread containing 10 wt % fat. There was one difference in procedure namely that after the water had been added shear was applied at a level of $10^4$ kPa in a standard dairy homogenizer. The comparison was also prepared by the technique of Example 1.

The composition of the external phase was:

| Ingredient | Example | Comparison |
| --- | --- | --- |
| NSCC 6110 | 9 | 9 |
| Gelatin 250 Bloom | 2.7 | 2.7 |
| Salt | 0.54 | 0.54 |
| Potassium-sorbate | 0.18 | 0.18 |
| β-Carotene | 0.045 | 0.045 |
| Sodium caseinate | 1.0 | 0.54 |
| Rape seed oil (low erucic) | — | 10 |
| Internal phase | 25 | — |
| Flavour | 0.262 | 0.262 |
| Water | 61.27 | 76.73 |

In the case of the spread according to the present invention an internal phase was prepared and used having the following composition:

| Ingredients | Percentage (w.w.) |
| --- | --- |
| Rape seed oil (low erucic) | 40 |
| Admul WOL | 3% |
| Salt | 0.6% |
| Potassium sorbate | 0.13% |
| Water | 56.27 |

The water-in-oil emulsion was then prepared by the standard procedure outlined above, homogenized at 10,000 kPa and then added to the external phase in a ratio of three parts of external phase to one part internal phase. The stress, strain and ratio parameters of the product according to the invention were: maximum stress 3.5 kPa, strain at maximum stress 0.15 and ratio of plastic and maximum stress 0.91. It was further established that the product according to the invention had a better visual appearance (opacity) and better salt and flavour release.

EXAMPLE 3

The procedure described in Example 1 was followed for preparing a spread containing 2 wt % fat.

The composition of the external phase was:

| Ingredient | Example | Comparison 1 | Comparison 2 |
| --- | --- | --- | --- |
| Paselli SA2* | 12.0 | 12.0 | 12.0 |
| Gelatin (270 Bloom) | 3.0 | 3.0 | 3.0 |
| Sunflower oil | — | 2 | 5 |
| Internal phase | 5.0 | | |
| Na-caseinate | 1.0 | 1.0 | 1.0 |
| Salt | 1.4 | 1.4 | 1,4 |
| K-sorbate | 0.12 | 0.12 | 0.12 |
| Water | 77.38 | 80.38 | 77.38 |
| Flavour | 0.1 | 0.1 | 0.1 |

*Paselli SA2 is according to recent information of the manufacturer a hydrolyzed starch/maltodextrin DE = 2.9.

With respect to the procedure of Example 1 there was one difference in this procedure namely that after the water had been added shear was applied at a level of $10^4$ kPa in a standard dairy homogenizer.

The composition of the internal phase was:

| Ingredient | Percentage (w.w.) |
|---|---|
| Sunflower oil | 40 |
| Admul WOL | 2.0 |
| Salt | 0.9 |
| Potassium sorbate | 0.12 |
| Water | 56.88 |
| Flavour | 0.1 |

The rheological parameters of this spread according to the present invention were similar to those of Example 1. The appearance of the product according to the invention was similar to the comparison containing 5% oil. The comparison containing 2% fat had a watery, translucent appearance and the salt and flavour release of the product according to the present invention was slower than of the comparisons.

I claim:

1. A water-continuous spread containing from 0.1 to 20 wt. % of fat, said spread being a W/O/W emulsion comprising hydrolysed starch with a DE of 1–6 in the external phase at a concentration above its critical gelling concentration, said spread having a stress strain relation with a maximum stress occurring at a strain of 0.01–1, the maximum stress at this strain being 0.1 to 100 kPa and with a ratio of plastic stress and the maximum stress of 0.1 to 1.

2. Spread according to claim 1 comprising from 0.1 to 30 wt % of hydrolysed starch and gelatin taken together.

3. Spread according to claim 2 wherein the gelatin has a bloom value of 200 to 270.

4. Spread according to claim 1, wherein the external water phase constitutes 20 to 99 wt %, more preferred 50 to 98 wt %, most preferred 70 to 97 wt % of the product.

5. Spread according to claim 1, wherein the level of fat is from 0.2 to 15 wt %, more preferred 0.5 to 10 wt %.

6. Spread according to claim 1, wherein the dispersed phases constitute from 1 to 80 wt % of the product and wherein the ratio fat to water in the dispersed phase is from 50:1 to 1:50.

7. Spread according to claim 1 wherein the spread contains from 0.01 to 2 wt % of an emulsifier system.

8. Spread according to claim 1 wherein the hydrolysed starch is a maltodextrin with a DE from 2 to 4.

9. Spread according to claim 1 wherein said spread has a fat level of 0.5 to 10 wt % calculated on the total composition.

10. Spread according to claim 1 wherein the fat phase is based on highly unsaturated vegetable oils.

* * * * *